(12) United States Patent
Naoe et al.

(10) Patent No.: US 11,927,267 B2
(45) Date of Patent: Mar. 12, 2024

(54) CHAIN GUIDE AND CHAIN TRANSMISSION DEVICE USING SAME

(71) Applicant: DAIDO KOGYO CO., LTD., Ishikawa (JP)

(72) Inventors: Toshiya Naoe, Ishikawa (JP); Hideaki Seki, Ishikawa (JP)

(73) Assignee: DAIDO KOGYO CO., LTD., Ishikawa (JP)

( * ) Notice: Subject to any disclaimer, the term of this patent is extended or adjusted under 35 U.S.C. 154(b) by 323 days.

(21) Appl. No.: 17/377,738

(22) Filed: Jul. 16, 2021

(65) Prior Publication Data

US 2021/0341038 A1 Nov. 4, 2021

Related U.S. Application Data

(63) Continuation of application No. PCT/JP2020/001994, filed on Jan. 21, 2020.

(30) Foreign Application Priority Data

Jan. 22, 2019 (JP) .................... 2019-008802

(51) Int. Cl.
 *F16H 7/18* (2006.01)
 *F16H 7/06* (2006.01)
 *F16H 7/08* (2006.01)

(52) U.S. Cl.
 CPC ............ *F16H 7/18* (2013.01); *F16H 7/06* (2013.01); *F16H 7/08* (2013.01); *F16H 2007/0872* (2013.01); *F16H 2007/0893* (2013.01); *F16H 2007/185* (2013.01)

(58) Field of Classification Search
 CPC ..... F16H 7/18; F16H 7/06; F16H 7/08; F16H 2007/0872; F16H 2007/0893; F16H 2007/185
 USPC ........................................... 474/111
 See application file for complete search history.

(56) References Cited

U.S. PATENT DOCUMENTS

| 9,689,475 B2 | 6/2017 | Geibel et al. | |
| 2012/0122620 A1* | 5/2012 | Lee ............ | F16H 7/18 474/140 |
| 2016/0097439 A1* | 4/2016 | Geibel ........ | F16H 7/08 474/111 |
| 2017/0009849 A1* | 1/2017 | Stiglmaier ... | F16H 7/08 |
| 2017/0276216 A1 | 9/2017 | Perissinotto et al. | |

(Continued)

FOREIGN PATENT DOCUMENTS

| CN | 101446213 | 6/2009 |
| CN | 207437709 | 6/2018 |

(Continued)

OTHER PUBLICATIONS

International Search Report dated Mar. 24, 2020 in International (PCT) Application No. PCT/JP2020/001994.

(Continued)

*Primary Examiner* — Gene O Crawford
*Assistant Examiner* — Emily R Kincaid
(74) *Attorney, Agent, or Firm* — Wenderoth, Lind & Ponack, L.L.P.

(57) ABSTRACT

A chain guide includes a contact guide portion that comes into contact with a chain and guides the chain, and a vibration control portion having a zero-touch surface extending along a travel line of the chain.

4 Claims, 11 Drawing Sheets

(56) References Cited

U.S. PATENT DOCUMENTS

2018/0195584 A1* 7/2018 Park ........................ F16H 7/08
2018/0245673 A1* 8/2018 Nakata ..................... F16H 7/08

FOREIGN PATENT DOCUMENTS

| JP | 2002-098203 | 4/2002 |
|----|-------------|--------|
| JP | 2002-115750 | 4/2002 |
| JP | 2003-113912 | 4/2003 |
| JP | 2006-002810 | 1/2006 |
| JP | 2015-14354  | 1/2015 |
| JP | 2015-218756 | 12/2015 |
| JP | 2018-145977 | 9/2018 |
| JP | 2018-173139 | 11/2018 |

OTHER PUBLICATIONS

Office Action dated Jul. 19, 2022 in Japanese Patent Application No. 2020-568172, with English-language translation.
The First Office Action dated Nov. 14, 2023 in corresponding Chinese Patent Application No. 202080010054.x, with English language translation.

* cited by examiner

ROTATION DIRECTION

FIG.5

EMBODIMENTS (BONDING METHOD)

| BONDING COUNTERPART MATERIAL OF SEGMENT | BONDING METHOD | DIAGRAMS |
|---|---|---|
| RESIN | INSERT MOLDING | |
| | SNAP-FIT | |
| | ADHESION | - |
| DIE-CASTING | SNAP-FIT | |
| | BOLT | |
| | ADHESION | - |
| PLATE METAL | SNAP-FIT | |
| | ADHESION | - | and b

CHAIN GUIDE AND CHAIN TRANSMISSION DEVICE USING SAME

CROSS-REFERENCE TO RELATED APPLICATIONS

This application is a Continuation of International Patent Application No. PCT/JP2020/1994, filed Jan. 21, 2020, which claims the benefit of Japanese Patent Application No. 2019-008802, filed Jan. 22, 2019, both of which are hereby incorporated by reference herein in their entirety.

BACKGROUND OF THE INVENTION

Field of the Invention

The present invention relates to a chain guide that comes into contact with a chain to guide the chain, and a chain transmission device using the same.

Description of the Related Art

In general, as shown in FIGS. 9A and 9B, a chain transmission device, for example, a timing chain transmission device 101 disposed in an engine, includes a crank sprocket 102, a cam sprocket 103, and a chain 104 wound between the crank sprocket 102 and the cam sprocket 103. A chain tensioner 105 is disposed on a slack side of the chain 104, and a chain guide 106 is disposed on a tension side of the chain 104. The chain guide 106 has a shoe 106a in sliding contact with substantially an entire region of the tension-side chain, and generates a normal force to each link of the chain due to a chain tension. As a result, frictional resistance is generated in a travel of the chain 104, and an energy loss is generated in the transmission of the timing chain transmission device 101. The longer a distance by which the chain guide 106 is in sliding contact with the chain 104, the larger the energy loss.

In the related art, PTL 1 and PTL 2 propose a chain guide in which a contact area between the chain guide and a chain is reduced to reduce the frictional resistance generated between the chain guide and the chain.

PTL 1 discloses a chain guide in which a bottom surface of a guide groove on which a chain slides is formed in a wavy shape by alternately connecting semicircular convex portions and concave portions that have equal curvatures. The chain guide guides the chain in a state where radii of the convex portions and the concave portions are smaller than a curvature radius of an abutting portion between the convex portions and a link plate and a contact area between the link plate and the chain guide is reduced.

PTL 2 discloses a chain guide having two contact portions in a traveling direction of a chain and a non-contact portion between these contact portions. The chain guide comes into sliding contact with and guides the chain on contact surfaces of the two contact portions, and the non-contact portion does not come into contact with the chain. Accordingly, a contact area between the chain guide and the chain is reduced, the non-contact portion is an opening portion, and a gap between the chain and an engine block can be reduced.

CITATION LIST

Patent Literature

PTL 1: JP-A-2015-218756
PTL 2: U.S. Pat. No. 9,689,475 specification

In the chain guide of PTL 1, even when oil is accumulated in the concave portions of the guide groove to improve an oil holding force and the frictional resistance is reduced by reducing the contact area between the chain guide and the chain, the link plate of the chain abuts against the convex portions intermittently and against the chain intermittently and in a polygonal manner, and thus abnormal noise due to slapping sound may be generated. Further, a contact pressure increases due to reduction in the contact surface, and thus the chain guide made of a synthetic resin may be worn away at an early stage.

In the chain guide of PTL 2, even when it is possible to make the timing chain compact by reducing the gap between the chain and the engine block and to reduce the frictional resistance by reducing the contact area between the chain guide and the chain, the non-contact portion having the opening portion is formed between the contact portions disposed apart from each other, and the chain travels in a non-contact manner without being guided. Accordingly, string vibration may occur on the chain due to a variable load by the engine, and abnormal noise or abnormal wear of the sliding surface may occur.

SUMMARY OF THE INVENTION

According to one aspect of the present invention, a chain guide includes a contact guide portion configured to come into contact with a chain and guide the chain, and a vibration control portion having a zero-touch surface extending along a travel line of the chain.

Further features of the present invention will become apparent from the following description of exemplary embodiments with reference to the attached drawings.

BRIEF DESCRIPTION OF THE DRAWINGS

FIG. 5 is a diagram showing embodiments related to the attachment of the sliding member to the chain guide.

DESCRIPTION OF THE EMBODIMENTS

Figure 1:
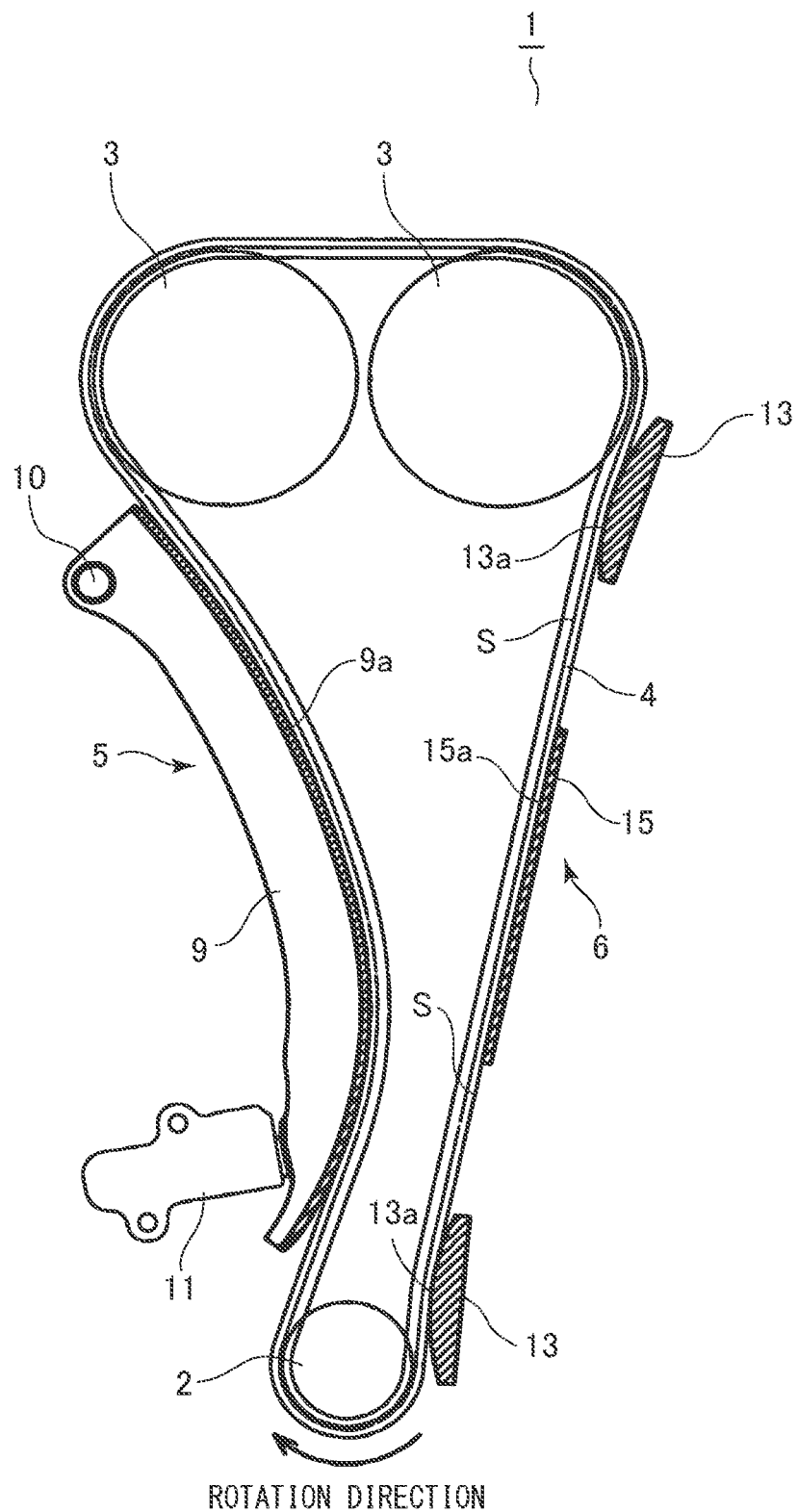
FIG. 1 is a front view showing a basic configuration according to an embodiment of the invention.
Figure 2:
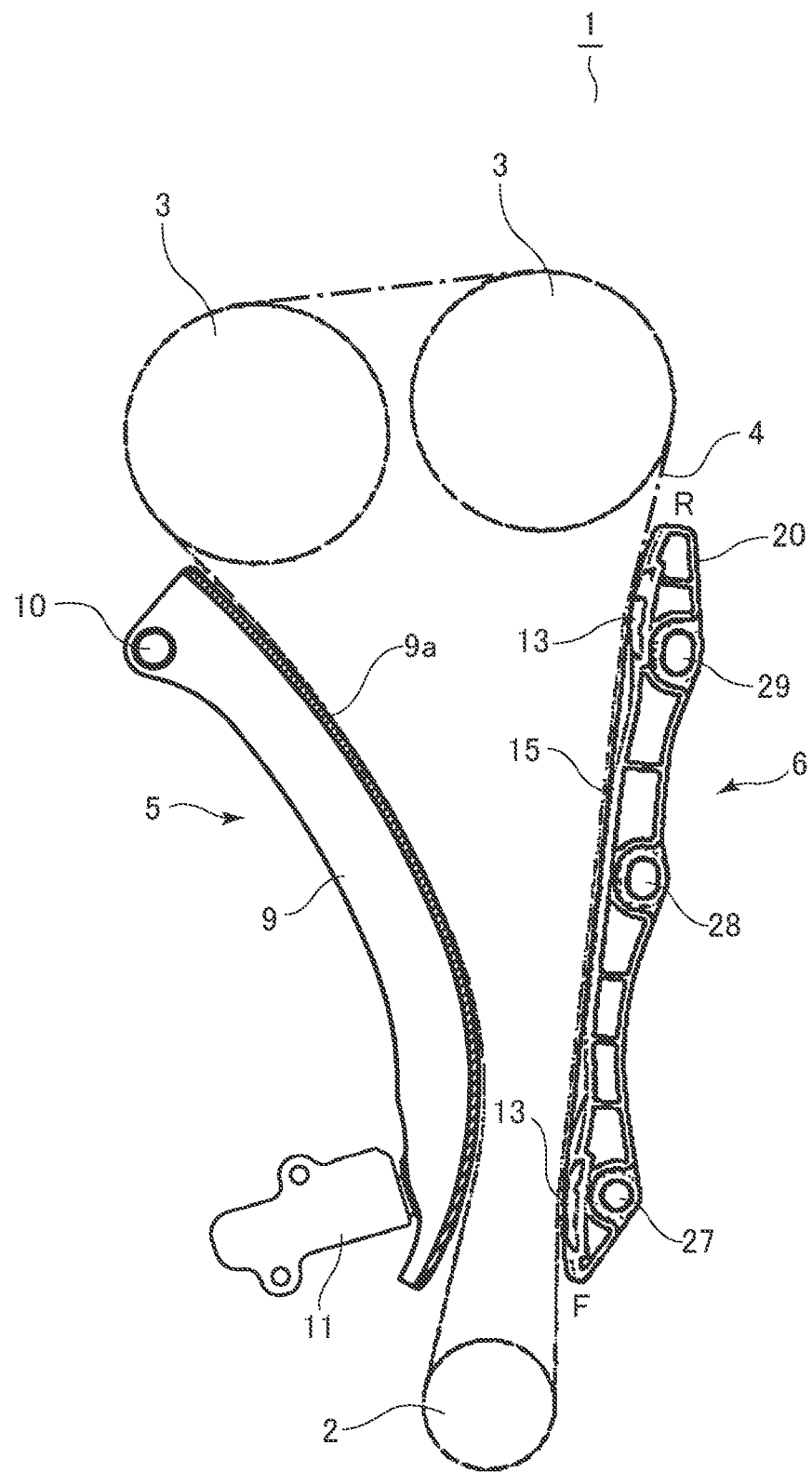
FIG. 2 is a front view showing a chain transmission device including a chain guide according to the embodiment of the invention.

Hereinafter, embodiments of the invention will be described with reference to the drawings. The present embodiment is applied to a timing chain transmission device that transmits rotation of an engine crankshaft to a camshaft. As shown in FIGS. 1 and 2, in the chain transmission device 1, a chain 4 is wound between an engine crank sprocket 2 on a drive side and two cam sprockets 3, 3 on a driven side. The chain 4 is preferably a silent chain, but is not limited thereto, and may be another transmission chain such as a roller chain or a bushing chain.

In the chain transmission device 1, a chain tensioner 5 is disposed to be in sliding contact with a slack side outer surface of the chain 4, and a chain guide 6 is disposed to be in sliding contact with a tension side outer surface of the chain 4. The chain tensioner 5 includes an arcuate member 9 made of a synthetic resin, a steel plate, or the like having wear resistance. An arcuate sliding contact surface 9a of the arcuate member is in sliding contact with the chain 4. One end of the arcuate member 9 is slidably supported by a pin 10, and the other end of the arcuate member 9 is connected to a hydraulic actuator 11. The chain tensioner 5 applies a predetermined tension to the chain 4 through the sliding contact surface 9a by supplying a hydraulic pressure to the hydraulic actuator 11.

As shown in the principle of FIG. 1, the chain guide 6 includes two shoe portions (contact guide portions) 13, 13 that are disposed at separate positions and guide the chain 4 by coming into contact with the chain 4 at a predetermined pressure, and a vibration control portion 15 that is disposed between the two shoe portions. The shoe portion 13 is formed of an arcuate member having a curved surface with a relatively small radius (for example, R100 or less). The curved surface serves as a sliding contact surface 13a that comes into contact with the chain 4. The vibration control portion 15 has a zero-touch surface 15a extending along a travel line S-S of the chain 4 guided by the shoe portions 13, 13. The zero-touch surface may have a linear shape or a curved surface having a large radius, and is basically slightly separated from the chain 4 to prevent string vibration of the chain 4 between the shoe portions 13, 13. The zero-touch surface 15a may slightly come into contact with the chain 4, and in this case as well, a normal force is hardly generated between the chain and the zero-touch surface 15a, and there is substantially no influence of travel resistance of the chain due to friction. Even when the zero-touch surface 15a pushes the chain 4 a little, an increase in the friction can be ignored. On the other hand, even when the zero-touch surface 15a is slightly separated from the chain 4 (for example, about 1 mm), although the string vibration may occur due to a separated amount, the vibration is fairly slight and does not affect traveling of the chain. The zero-touch surface 15a is along the travel line S-S of the chain 4 in a manner that the chain is touched or not touched, that is, a difference between the zero-touch surface 15a and the chain is 0. In design, the zero-touch surface 15a is disposed to be fairly adjacent to the chain 4 along the travel line S-S, but actually, the zero-touch surface 15a may push the chain 4 by approximate to 1 [mm] or be separated from the chain 4 by approximate to 1 [mm] due to a manufacturing variation, a mounting variation, vibration of the chain, or the like, and the zero-touch surface 15a is defined as a zero-touch surface including these.

Figure 9A:
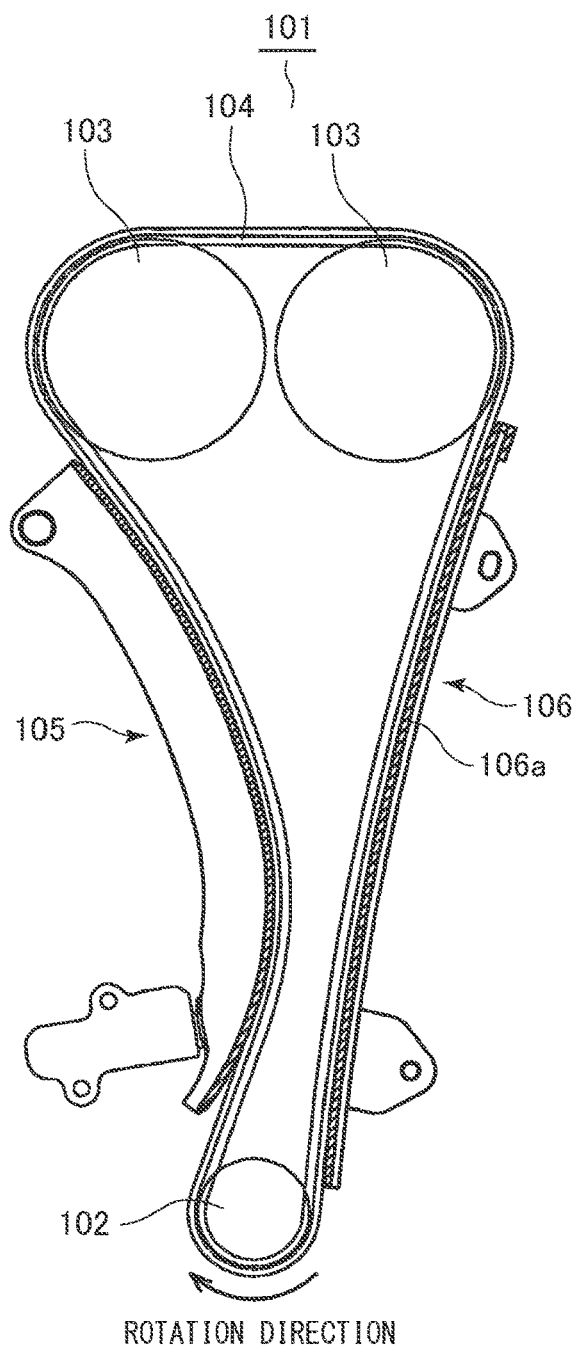
FIG. 9A is an overall front view of a chain transmission device including the chain guide of the related art.
Figure 9B:
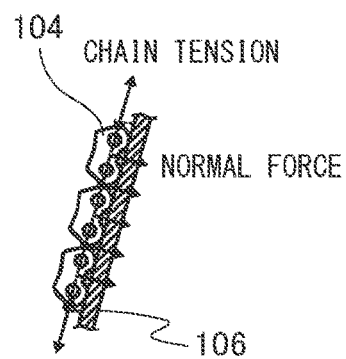
FIG. 9B is a cross-sectional view of a part of the chain transmission device shown in FIG. 9A.

Therefore, in the chain guide 6, only the shoe portions 13, 13 come into contact with the chain 4, and a contact area is significantly reduced (for example, by ⅒ or less) as compared with a chain guide 106 of the related art (see FIGS. 9A and 9B) that is in sliding contact with a substantially entire surface of a traveling portion of the chain. Therefore, a frictional resistance is reduced (for example, by 10% or more), and an energy loss due to the travel resistance of the chain transmission device 1 can be significantly reduced. In addition, since the vibration control portion 15 prevents the string vibration of the chain, it is possible to prevent abnormal noise due to slapping sound of the chain, abnormal wear due to poor engagement with the sprocket, timing failure between a cam and a crank, and breakage or tooth jump of the chain due to abnormal tension.

Figure 3:
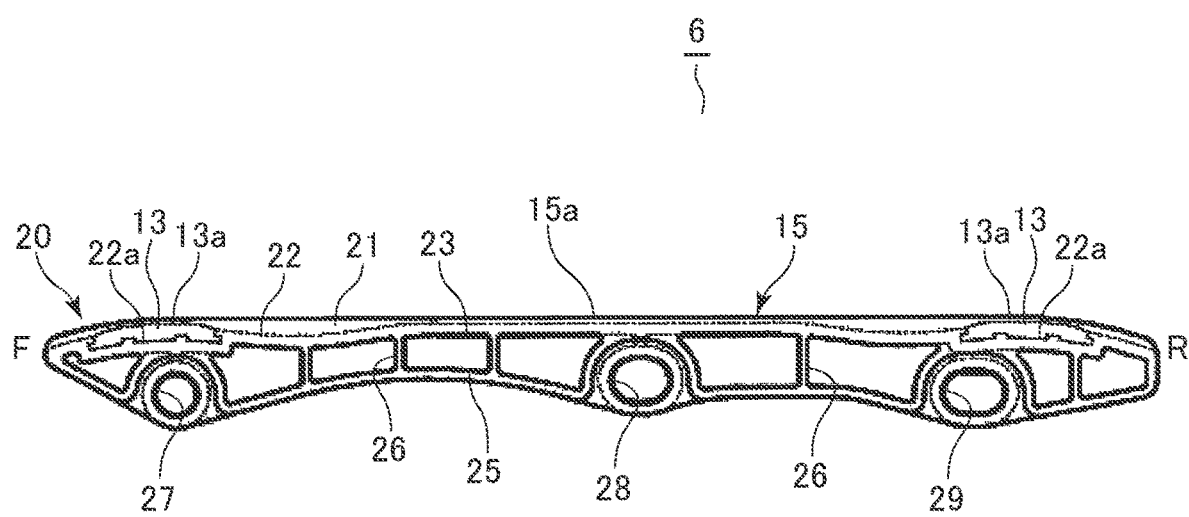
FIG. 3 is a front view of the chain guide.

Next, an embodiment in which the chain guide is embodied will be described with reference to FIGS. 2 and 3. The chain guide 6 includes a main body 20. The shoe portions 13, 13 are fixed to both end portions (first and second end portions) in a longitudinal direction on a front side of the main body 20, and the vibration control portion 15 is formed in the main body 20 at a portion between the two shoe portions. Since the main body 20 is disposed in the timing chain transmission device 1 in an engine, the main body 20 has heat resistance and oil resistance. The vibration control portion 15 basically does not come into contact with the chain 4, and thus the wear resistance is not required to that degree, and a general synthetic resin which is not expensive, such as polyamide (PA) 46 and polyamide (PA) 66, is used, and the vibration control portion 15 is molded into a shape shown in FIG. 3 by injection-molding. On a front surface side (chain side surface) of the main body 20, a recessed groove portion 22 having edge portions 21 at both ends in a width direction is formed, and upper surfaces of the edge portions have a substantially linear shape in a chain traveling (front-rear) direction. The recessed groove portion 22 includes shoe mounting portions 22a, 22a at both front and rear end portions of a bottom surface, and is a guide groove extending in the front-rear direction in a slightly uneven manner to guide the chain 4. A central portion of the recessed groove portion 22 in the front-rear direction serves as the zero-touch surface 15a over a predetermined length. That is, the zero-touch surface 15a extends in parallel in a straight-line shape along the travel line of the chain 4 at a position where the zero-touch surface 15a comes into contact with or does not come into contact with the chain on the bottom surface of the guide groove, and a portion including the zero-touch surface 15a constitutes the vibration control portion 15.

The main body 20 includes a back side portion 25, and a front side portion 23 including the recessed groove portion 22 constituting the guide groove. The front side portion 23 and the back side portion 25 have thickness for surrounding a long shape and are connected by a plurality of ribs 26. A thin plate or an opening is formed between the ribs. Fixing holes (fixing portions) 27, 28, 29 configured to fix the main body 20 to a fixing member such as the engine block are formed between the front side portion 23 and the back side portion 25. The front fixing hole 27 is formed in a circular shape and is fitted to a bolt or the like without loosening, and the intermediate and rear fixing holes 28, 29 are formed in an oval shape and can adjust a fixing position of the main body 20.

The shoe portion 13 is attached to the shoe mounting portion 22a of the main body 20 by an appropriate fixing method such as insert molding, adhesion, or snap-fit. The shoe portion 13 is in sliding contact with the chain 4 to guide the chain. The shoe portion 13 has a relatively small length in the traveling (front-rear) direction of the chain in the vicinity of the crank sprocket 2 (drive side) and the cam sprocket 3 (driven side) on a chain tension side, and an upper surface of the shoe portion 13 serves as the sliding contact surface 13a formed of a curved surface having a relatively small radius. Since the shoe portion 13 abuts against the chain 4 at a predetermined vertical pressure and has a small length, it is preferable to use a synthetic resin having high wear resistance due to a relatively large surface pressure acting between the shoe portion 13 and the chain 4. For the synthetic resin (engineering plastic) of the shoe portion 13, a normal specification synthetic resin such as a polyamide resin used in the main body 20 is insufficient in strength, relatively expensive polyacetal (polyoxymethylene), polyether ether ketone, or the like can be applied, and a polyimide resin is preferable from the viewpoint of ease of molding of the shoe portion. The polyimide resin has sufficient wear resistance even at a relatively high surface pressure. Although the polyimide resin is relatively expensive, the shoe portion 13 is a fairly small part of the chain guide 6 and requires a small amount of material to be used, and an increase in cost of the chain guide can be prevented.

In the chain transmission device 1, the chain guide 6 is attached to the engine block (fixing member) by fastening bolts through the fixing holes 27, 28, 29. At this time, the chain guide 6 is adjusted so that both the shoe portions 13, 13 come into contact with the tension side outer surface of the chain 4 at a predetermined pressure and the zero-touch surface 15a comes fairly adjacent to the travel line S-S of the chain stretched by both the shoe portions 13, 13.

When the crank sprocket 2 is rotated by rotation of the engine, the rotation is transmitted to the cam sprockets 3, 3 via the chain 4, and the camshaft is rotated at an appropriate timing. The chain 4 of the chain transmission device 1 is applied with a predetermined tension by the chain tensioner 5, and the tension side of the chain 4 is in sliding contact with the shoe portions 13, 13 of the chain guide 6 to properly guide the chain 4, so that the chain 4 travels along the zero-touch surface 15a of the vibration control portion 15 between the shoe portions 13, 13. At this time, the tension of the chain 4 changes due to a change in a load of the engine or the like, and there is movement such as the string vibration generated between the shoe portions 13, 13 (for example, generated at around an engine rotation speed of 2000 to 5000 rpm). However, the movement of the chain 4 is restricted by the zero-touch surface 15a of the vibration control portion, and the generation of string vibration is prevented so that the chain 4 travels.

Figure 4A:
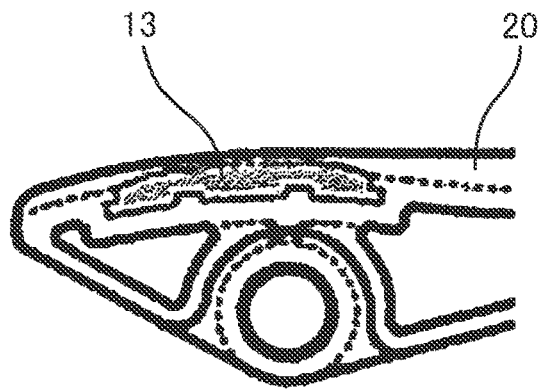
FIG. 4A is a view showing attachment of a sliding member to the chain guide.
Figure 4B:
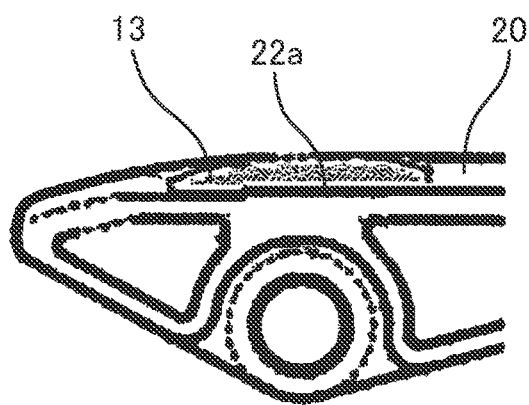
FIG. 4B is a view showing attachment of the sliding member to the chain guide, which is different from FIG. 4A.

Next, attachment of the shoe portion 13 to the main body 20 will be described. As shown in resin of FIGS. 3, 4A, and 5, the shoe portion 13 is insert-molded when the main body 20 of the chain guide 6 is injection-molded. Further, as shown in FIG. 4B, the main body 20 is formed by injection-molding using a normal specification synthetic resin. At this time, the shoe mounting portion 22a formed of a flat surface or a recess is formed in a part of the guide groove 22 of the main body, and the shoe portion 13 is bonded to the shoe mounting portion 22a by an adhesive. As shown in the snap-fit of the resin in FIG. 5, concave engagement grooves 30 are formed on both side surfaces of front and rear portions of the main body 20 made of the synthetic resin. A recessed groove is formed in a lower portion of the shoe portion 13, and engagement protrusions 31 protruding inward are formed on both side surfaces of the recessed groove. The engagement protrusions 31 having elasticity are engaged with the engagement grooves 30, and the shoe portion 13 is attached to the main body 20. In the chain guide 6 in which the main body 20 is formed of a synthetic resin, the vibration control portion 15 having the zero-touch surface 15a is integrally molded with the main body 20.

The main body 20 may be formed by die casting. As shown in the snap-fit by die-casting in FIG. 5, the engagement grooves 30 are formed on both side surfaces of the main body 20 in the same manner as the snap-fit made of the resin. The shoe portion 13 is formed with the engagement protrusions 31 that engage with the engagement grooves 30, and the shoe portion 13 made of the synthetic resin and having elasticity is mounted on the main body 20 by the engagement protrusions 31 engaging with the engagement grooves 30 of the main body 20. As shown in the bolt in the die casting of FIG. 5, the shoe portion 13 made of a synthetic resin may be fixed to the main body 20 formed by the die casting with bolts 34.

Figure 4C:
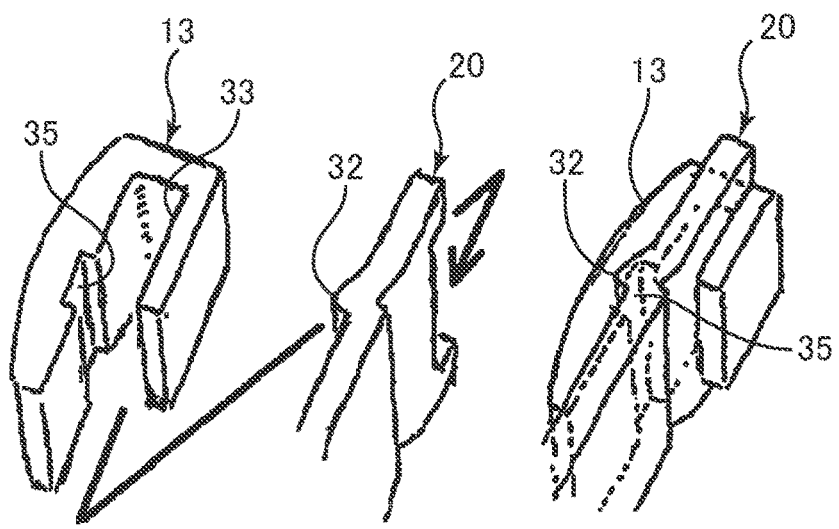
FIG. 4C is a view showing attachment of the sliding member to the chain guide, which is different from FIGS. 4A and 4B.
Figure 6A:
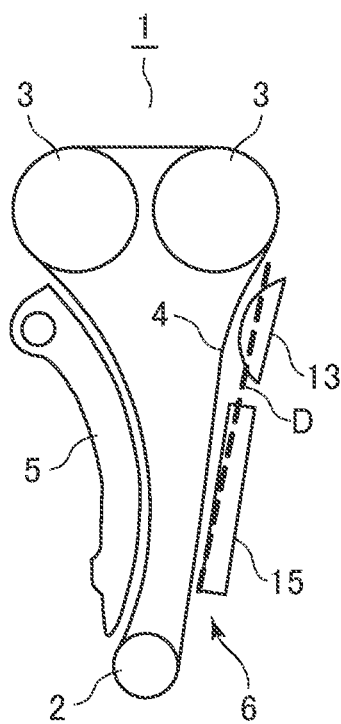
FIG. 6A is a front view of the chain transmission device showing an arrangement structure of the chain guide.
Figure 6B:
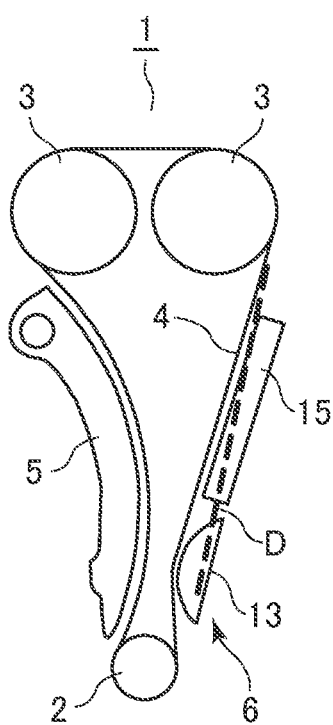
FIG. 6B is a front view of the chain transmission device showing another arrangement structure of the chain guide.
Figure 6C:
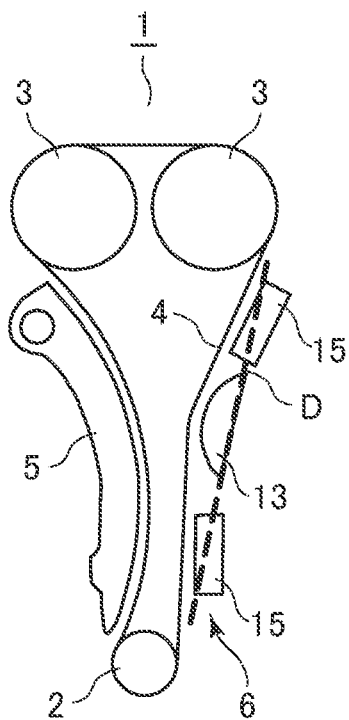
FIG. 6C is a front view of the chain transmission device showing another arrangement structure of the chain guide.
Figure 6D:
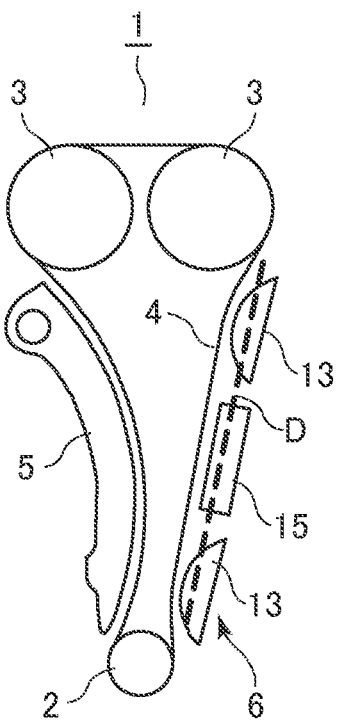
FIG. 6D is a front view of the chain transmission device showing another arrangement structure of the chain guide.
Figure 6E:
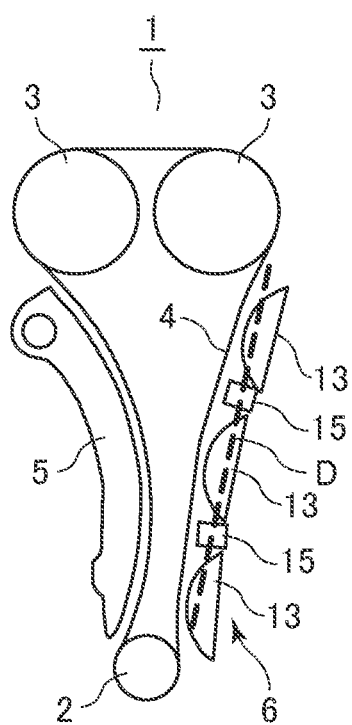
FIG. 6E is a front view of the chain transmission device showing another arrangement structure of the chain guide.

As shown in FIG. 4C and a sheet metal of FIG. 5, the main body 20 may be formed of a sheet metal. Engagement protrusions 32 are formed on both end portions of the main body 20 in the front-rear direction. In the shoe portion 13, a recessed groove 33 is formed, and an engagement recessed portion 35 is formed inside of the member of the sliding contact surface 13a. The shoe portion 13 made of a synthetic resin is attached to the main body 20 by engaging the engagement protrusion 32 of the main body 20 made of a sheet metal and having elasticity with the engagement recessed portion 35.

The shoe portion 13 may be fixed to the main body 20 formed by the die casting and the main body 20 formed by a sheet metal by adhesion with an adhesive. The vibration control portion made of a synthetic resin is fixed to the main body 20 formed by the die casting or a sheet metal by fixing methods such as the snap-fit, the adhesion, or the bolts. At this time, the vibration control portion 15 having the zero-touch surface 15a may be formed in the main body 20 made of a sheet metal, or a general synthetic resin such as polyamide may be attached to the main body 20 made of a sheet metal, and the above-described polyimide resin or the like having excellent wear resistance is used for the shoe portion 13.

Next, embodiments in which the arrangement of the shoe portion 13 and the vibration control portion 15 in the chain guide 6 is different will be described with reference to FIGS. 6A to 6E. The chain guide 6 is used together with the chain tensioner 5 in the timing chain transmission device 1 described above, and D shown by a dotted line in the figure is a tangent line on the tension side connecting the crank sprocket 2 and the cam sprocket 3. In the chain guide 6 shown in FIG. 6A, one shoe portion 13 and one vibration control portion 15 are provided, and the vibration control portion 15 is disposed on a sprocket 2 side, which is the drive side, and the shoe portion 13 is disposed on a sprocket 3 side, which is the driven side. In the chain guide 6 shown in FIG. 6B, one shoe portion 13 and one vibration control portion 15 are provided, and the shoe portion 13 is disposed on the sprocket 2 side, which is the drive side, and the vibration control portion 15 is disposed on the sprocket 3 side, which is the driven side. In the chain guide 6 shown in FIG. 6C, one shoe portion 13 and two vibration control portions 15, 15 are provided, and the shoe portion 13 is disposed between the two vibration control portions 15. Similar to FIGS. 1 and 2, the chain guide 6 shown in FIG.

6D includes two shoe portions 13, 13 and one vibration control portion 15, and the vibration control portion 15 is disposed between the two shoe portions 13. The chain guide 6 shown in FIG. 6E includes three shoe portions 13, 13, 13 and two vibration control portions 15, 15, and the vibration control portions 15 are disposed between the shoe portions 13.

The shoe portion 13 and the vibration control portion 15 are preferably formed of one member (for example, the main body 20) as shown in FIG. 2, and may also be formed of separate members or be arranged in arrangement other than the arrangement shown in FIGS. 6A to 6E. For example, the vibration control portion 15 may be disposed on an inner side or on both an inner side and an outer side of the chain 4.

Figure 7:
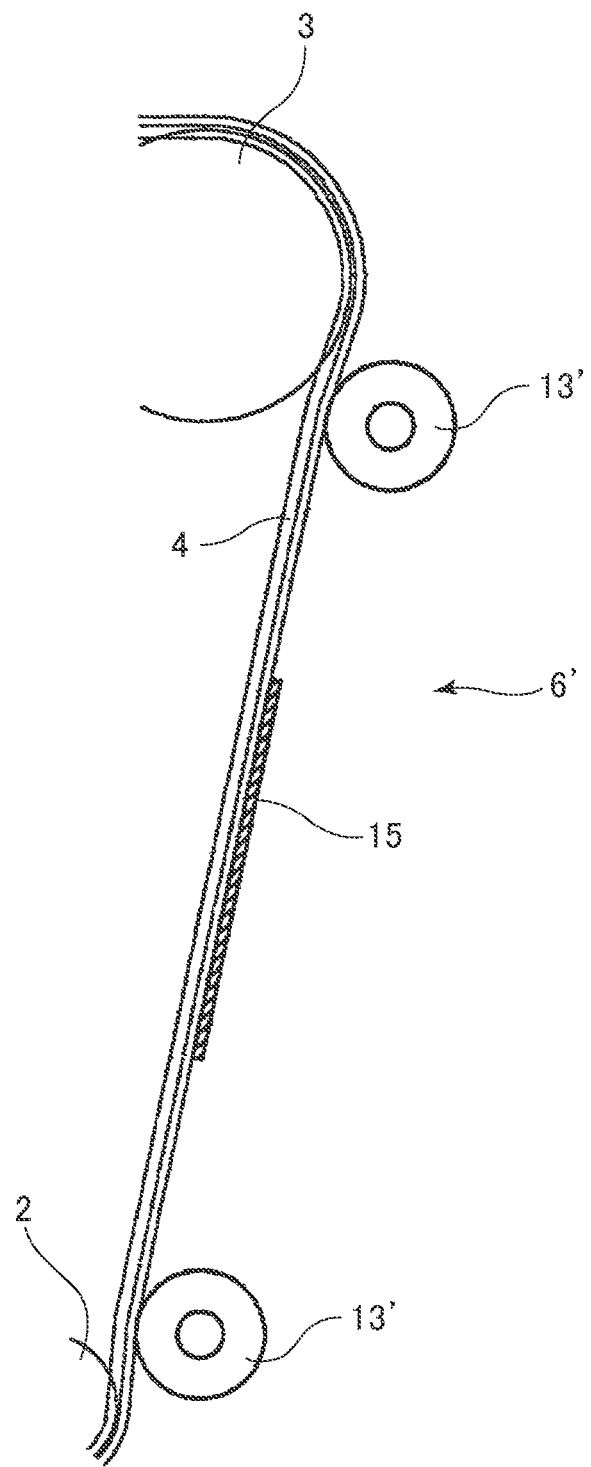
FIG. 7 is a schematic front view showing a chain guide according to a different embodiment.

The contact guide portion that guides the chain 4 is preferably the shoe portion 13 having the sliding contact surface 13a that comes into sliding contact with the chain 4, but the contact guide portion is not necessarily limited to the shoe portion, and may be another member such as a rotation member. As shown in FIG. 7, a chain guide 6' includes rotation portions 13' that are rotatably supported by shafts via bearings, and the vibration control portion 15. The rotation portions 13', which are contact guide portions, are disposed correspondingly near the drive side sprocket 2 and the driven side sprocket 3, rotate in contact with the chain 4, and guide the chain 4. The vibration control portion 15 is disposed between the two rotation portions 13', 13'.

Figure 8:
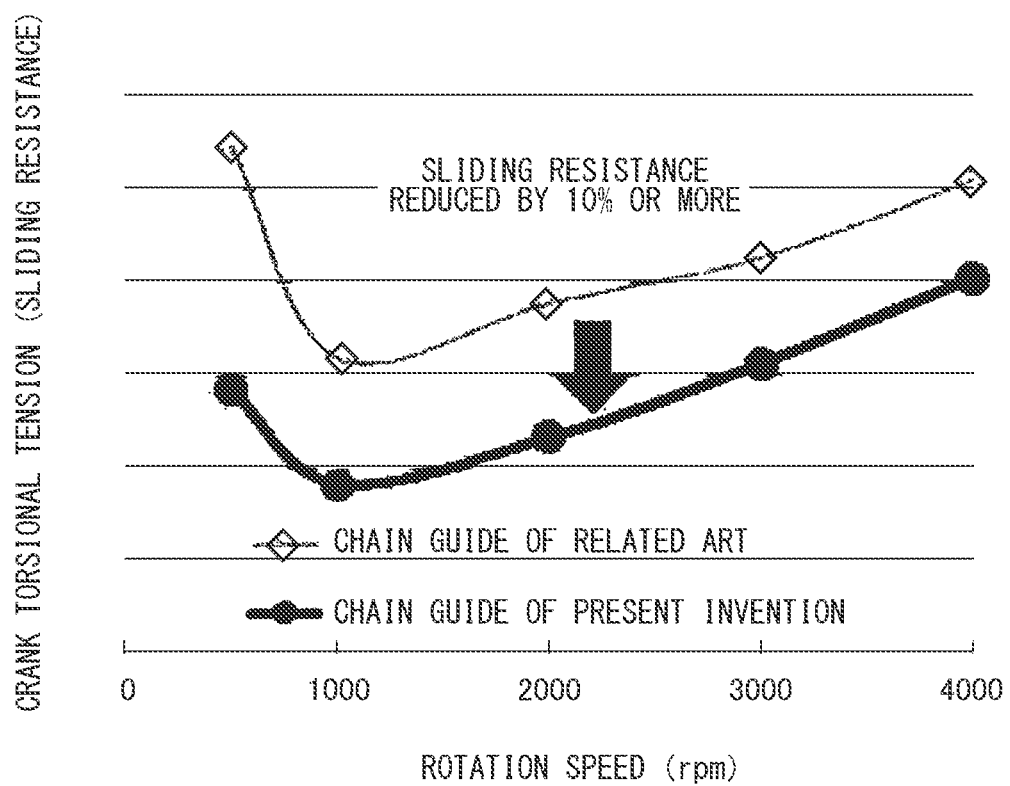
FIG. 8 is a diagram of a test result showing sliding resistance of a chain guide of the related art and sliding resistance of the chain guide according to the invention.

FIG. 8 shows a result of a test in which the chain guide 106 (see FIG. 9) of the related art that slidably guides substantially the entire area of the tension side of the chain transmission device is compared with the chain guide 6 according to the invention shown in FIG. 2. In the chain guide 6 according to the invention, the shoe portion 13 is made of polyimide resin, and the vibration control portion 15 is made of polyamide resin integrally formed with the main body 20. The chain guide 106 of the related art or the chain guide 6 according to the invention is mounted on a sliding resistance head tester equipped with a small engine, and a crank torsional tension is measured at different rotation speeds. As a result, at all the rotation speeds, a sliding resistance of the chain guide 1 according to the invention is reduced by 10% or more as compared with the chain guide of the related art.

In the above-described embodiments, for convenience, the member 6 is referred to as a chain guide, and the member 9 is referred to as the arcuate member 9 of the chain tensioner 5, and these members 6 and 9 are chain guides that come into contact with and guide the chain 4 on the tension side and the slack side of the chain 4. Therefore, similar to the chain guide 6, the arcuate member 9 may also include a contact guide portion that comes into contact with a chain and guides the chain, and a vibration control portion having a zero-touch surface extending along a travel line of the chain. Further, as for a shape of the arcuate member 9, as shown in FIGS. 1 and 6A to 6E described above, various configurations can be adopted for the contact guide portion and the vibration control portion.

Although the above-described embodiments are applied to the timing chain transmission device, the invention is not limited thereto and may be applied to other in-engine chains. Further, the invention is not limited to the in-engine chains and can be applied to any chain transmission device.

The chain guide includes the contact guide portion such as the shoe portion and the vibration control portion having the zero-touch surface. Accordingly, the contact guide portion that guides the chain can have a short contact length with the chain, and a contact area between the chain and the contact guide portion can be reduced to reduce an energy loss. Meanwhile, the zero-touch surface of the vibration control portion can prevent string vibration of the chain, and it is possible to reduce problems due to the vibration, for example, generation of abnormal noise, abnormal wear due to poor engagement with the sprocket, and breakage or tooth jump of the chain due to abnormal tension.

The shoe portion serving as the contact guide portion is fixed to the main body made of the synthetic resin and the vibration control portion is integrally molded with the main body, and the zero-touch surface of the vibration control portion does not substantially come into contact with the chain to generate a normal force. Accordingly, wear does not progress early even when a normal specification synthetic resin (for example, a polyamide resin) is used and the main body can be easily manufactured by injection-molding or the like using the normal specification synthetic resin. Meanwhile, since the shoe portion in sliding contact with the chain is made of a synthetic resin having wear resistance (for example, polyimide resin), the shoe portion has sufficient durability even when a high surface pressure due to a relatively small contact area is applied. At the same time, an increase in cost can be prevented even when the shoe portion uses a relatively expensive resin since the resin is used in a small amount.

The shoe portion is fixed to each of both end portions in the longitudinal direction of the main body, and the vibration control portion is disposed between two shoe portions. Accordingly, the pressure from the shoe portion due to sliding contact with the chain can be received by the main body in a balanced manner, the zero-touch surface can be located along the travel line of the chain defined by the two shoe portions, and it is easy to attach the chain guide to the chain transmission device by fixing the main body. Meanwhile, the shoe portions are fixed to the main body by insert molding or the like, and a chain guide having sufficient strength can be relatively easily manufactured with high accuracy.

The chain transmission device using the chain guide can reduce frictional resistance between the chain guide and the chain, prevent the energy loss, reduce the string vibration of the chain, and perform stable power transmission.

By applying the chain guide to a timing chain transmission device, the energy loss can be reduced, and stable timing with high accuracy can be maintained over a long period of time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Industrial Applicability

The chain guide can guide a chain in a chain transmission device such as a timing chain transmission device.

What is claimed is:

1. A chain guide comprising:
a main body including a fixing portion configured to fix the main body to a fixing member;
first and second shoe portions each of which is made of a synthetic resin having wear resistance and includes a sliding contact surface that is in sliding contact with the chain; and
a vibration control portion having a zero-touch surface extending along a travel line of the chain, wherein the zero-touch surface is a linear or curved surface located away from the travel line of the chain so as to contact with the chain in a case where a string vibration of the chain occurs such that the zero-touch surface controls the string vibration of the chain, the first shoe portion is fixed to a first end portion in a longitudinal direction on a front surface side of the main body, the second shoe portion is fixed to a second end portion, opposite to the first end portion, in a longitudinal direction on the front surface side of the main body, and the vibration control portion having the zero-touch surface is integrally molded with the main body in such a manner that the vibration control portion is disposed between the first and second shoe portions.

2. The chain guide according to claim 1, wherein the main body is made of a synthetic resin.

3. A chain transmission device comprising:
a drive side sprocket;
a driven side sprocket;
a chain wound between the drive side sprocket and the driven side sprocket; and
the chain guide according to claim 1,
wherein the chain guide is disposed on a tension side of the chain so that the zero-touch surface is adjacent to a travel line of the chain.

4. The chain transmission device according to claim 3, wherein
the drive side sprocket is a crank sprocket, the driven side sprocket is a cam sprocket, and the chain transmission device is a timing chain transmission device,
the first shoe portion is disposed near the crank sprocket and the second shoe portion is disposed near the cam sprocket, and
the zero-touch surface is disposed to be adjacent to the travel line of the chain guided by the first and second shoe portions.

* * * * *